United States Patent
Borthakur et al.

(10) Patent No.: US 9,904,689 B2
(45) Date of Patent: Feb. 27, 2018

(54) PROCESSING A FILE SYSTEM OPERATION IN A DISTRIBUTED FILE SYSTEM

(75) Inventors: Dhrubajyoti Borthakur, Sunnyvale, CA (US); Dmytro Molkov, Menlo Park, CA (US); Hairong Kuang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 444 days.

(21) Appl. No.: 13/549,377

(22) Filed: Jul. 13, 2012

(65) Prior Publication Data

US 2014/0019495 A1 Jan. 16, 2014

(51) Int. Cl.
*G06F 17/30* (2006.01)
*G06F 11/14* (2006.01)

(52) U.S. Cl.
CPC .... *G06F 17/30203* (2013.01); *G06F 11/1435* (2013.01); *G06F 17/30283* (2013.01)

(58) Field of Classification Search
CPC ........... G06F 11/1435; G06F 17/30283; G06F 17/30203
USPC ......................................................... 714/15
See application file for complete search history.

(56) References Cited

U.S. PATENT DOCUMENTS

| | | | |
|---|---|---|---|
| 5,903,898 A | 5/1999 | Cohen et al. | |
| 5,951,695 A | 9/1999 | Kolovson | |
| 6,032,216 A | 2/2000 | Schmuck et al. | |
| 6,643,795 B1 | 11/2003 | Sicola et al. | |
| 7,111,189 B1* | 9/2006 | Sicola et al. | 714/6.21 |
| 7,152,181 B2 | 12/2006 | Fung et al. | |
| 7,406,487 B1 | 7/2008 | Gupta et al. | |
| 7,610,307 B2* | 10/2009 | Havewala et al. | |
| 7,664,991 B1* | 2/2010 | Gunda et al. | 714/43 |
| 7,734,951 B1* | 6/2010 | Balasubramanian et al. | 714/6.13 |
| 8,276,022 B2* | 9/2012 | Silberstein | G06F 11/1443 714/18 |
| 8,819,106 B1* | 8/2014 | Sirota | G06F 9/485 709/201 |
| 2003/0177150 A1* | 9/2003 | Fung et al. | 707/204 |
| 2004/0078397 A1* | 4/2004 | Mehta et al. | 707/202 |
| 2004/0172421 A1* | 9/2004 | Saito et al. | 707/200 |
| 2007/0180302 A1* | 8/2007 | Allen et al. | 714/6 |
| 2009/0006888 A1* | 1/2009 | Bernhard et al. | 714/6 |
| 2009/0271418 A1* | 10/2009 | Vaghani et al. | 707/100 |
| 2010/0146331 A1 | 6/2010 | Reed et al. | |
| 2011/0191300 A1* | 8/2011 | Orenstein et al. | 707/646 |

(Continued)

OTHER PUBLICATIONS

Wang, Feng, et al. "Hadoop high availability through metadata replication." Proceedings of the first international workshop on Cloud data management. ACM, 2009.*

(Continued)

*Primary Examiner* — Alford Kindred
*Assistant Examiner* — Jesse P Frumkin
(74) *Attorney, Agent, or Firm* — Van Pelt, Yi & James LLP (57) ABSTRACT

Processing a file system operation is disclosed. An indication of a desired operation of a distributed file system is received. A metadata node for the desired operation is identified. It is indicated to the identified metadata node to process the desired operation. In the event the identified metadata node becomes not fully functional before the processing by the identified metadata node is confirmed, the distributed file system is analyzed to determine whether to indicate again to process the desired operation.

20 Claims, 7 Drawing Sheets

(56) References Cited

U.S. PATENT DOCUMENTS

| | | | |
|---|---|---|---|
| 2012/0130950 A1* | 5/2012 | Jain | G06F 17/30212 |
| | | | 707/634 |
| 2013/0024728 A1* | 1/2013 | Lee et al. | 714/20 |
| 2013/0097457 A1* | 4/2013 | Drucker | G06F 11/20 |
| | | | 714/4.11 |
| 2013/0111262 A1* | 5/2013 | Taylor | G06F 11/2005 |
| | | | 714/4.11 |
| 2013/0151884 A1* | 6/2013 | Hsu et al. | 714/4.11 |
| 2013/0198739 A1 | 8/2013 | Razdan et al. | |
| 2013/0204948 A1* | 8/2013 | Zeyliger | G06F 9/44505 |
| | | | 709/206 |
| 2013/0304694 A1* | 11/2013 | Barreto | G06F 17/30283 |
| | | | 707/608 |

OTHER PUBLICATIONS

White, Tom. Hadoop: The definitive guide. "O'Reilly Media, Inc.", 2009. ISBN-13: 978-0-596-52197-4.*

Borthakur, Dhruba. "Hadoop AvatarNode High Availability". HDFS: Hadoop AvatarNode High Availability. Recorded on the Internet Archive on Dec. 4, 2010 and retrieved on Nov. 12, 2014.*

Li, Bing, Yutao He, and Ke Xu. "Distributed metadata management scheme in cloud computing." In Pervasive Computing and Applications (ICPCA), 2011 6th International Conference on, pp. 32-38. IEEE, 2011.*

Borthakur et al., "Apache Hadoop goes realtime at Facebook", In Proceedings of the 2011 international conference on Management of data, pp. 107-1080. ACM, 2011.

* cited by examiner

PROCESSING A FILE SYSTEM OPERATION IN A DISTRIBUTED FILE SYSTEM

BACKGROUND OF THE INVENTION

In a distributed file system, a metadata node tracks metadata such as directory structure and locations of where data of the file system are distributed. Changes to the directory structure or locations of data in the file system need to be tracked and obtained from the metadata node. Thus if the metadata node becomes unavailable, the entire distributed file system may become unavailable. Although a backup metadata node may be used to replace an unusable metadata node, the replacement of the metadata node requires time and human intervention (e.g., a system administrator) to manually shut down the unusable metadata node, prepare the backup metadata node as the new metadata node, and configure other components of the distributed file system to use the new metadata node. Not only does this manual process consume valuable human resources, the file system becomes unusable for a prolonged period of time during the human intervention. Additionally, a client using the metadata node that becomes unusable needs to efficiently handle the failure. Therefore, there exists need for a better way to resolve situations when a metadata node becomes not fully functional.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automated replacement of an active metadata node of a distributed file system is disclosed. In some embodiments, the distributed file system stores data across a plurality of connected servers and/or nodes and logically presents the stored data as part of a same file system. In some embodiments, the distributed file system offers a highly fault-tolerant file system that can be deployed on low-cost hardware servers. An example of the distributed file system includes Hadoop Distributed File System (i.e., HDFS) of The Apache Software Foundation. In some embodiments, an active metadata node of the distributed file system maintains the file system's metadata (e.g., namespace, directory structure and file and directory names, data location in distributed data nodes, etc.). When it is determined that the active metadata node should no longer be the active metadata node of the file system (e.g., due to failure, maintenance or upgrade), a standby metadata node is automatically switched, without human intervention, as the new active metadata node.

Before the standby metadata node becomes the active metadata node, the current active metadata node is prevented from acting as the active metadata node by disabling its ability to write to a transaction log of the file system. For example, a command is issued to the transaction log that indicates that the standby metadata node would like to become an exclusive metadata node to write to the transaction log. Because the transaction log may only allow one metadata node to be the writer of the transaction log at one time, the transaction log disables the current active metadata node from writing to the log and the standby metadata node acquires the ability to write to the transaction log before becoming the new active metadata node. Any changes to the file system by the previous active metadata node will now fail because this metadata node is now unable to write to the transaction log. Once it is confirmed that the metadata node is the exclusive metadata node writer to the transaction log, an indication is provided that the standby metadata node has become the new active metadata node of the distributed file system. A user desiring to communicate with an active metadata node of the file system will now be directed to the newly active metadata node. In some embodiments, after the previously active metadata node is processed (e.g., fixed, maintained, or upgraded), the previously active directory becomes the new standby metadata node that is ready to become an active metadata node again when needed.

Selectively retrying an operation of a distributed file system is disclosed. In some embodiments, an indication of a desired operation associated with a file of a distributed file system is received at a client of a distributed file system. For example, a user of the client may desire to read a file of the distributed file system. A metadata node for the desired operation is identified. The identification of the metadata node may be cached and/or identified using a coordination node that provides an identifier of the current active metadata node. The desired operation is indicated to the identified metadata node to process the desired operation. For example, due to the indication, the identified metadata node may rename a file in the namespace or provide identifications of data nodes storing portions of the file. However, the identified metadata node may become not fully functional before the processing by the identified metadata node is confirmed. In this case, the distributed file system is analyzed to determine whether to indicate again to a metadata node to process the desired operation. For example, a failure in the current active metadata node may occur and the active metadata node may have to be replaced by another metadata node. If processing by the identified metadata node is not confirmed, it is unknown at which processing stage the metadata node became not fully functional. If processing the desired operation will not change the file system (e.g., a read operation), the desired operation may be retried in its entirety because the retry will not change the file system. However, if the desired operation will change the file system, it is desirable to determine what changes to the file system have been already completed by the metadata node before the node becomes not fully functional in order to not duplicate changes that have been already completed as a part of processing by the metadata node. Based on this analysis, none, a portion, or the entire processing required to process the desired operation may be indicated again.

Figure 1:
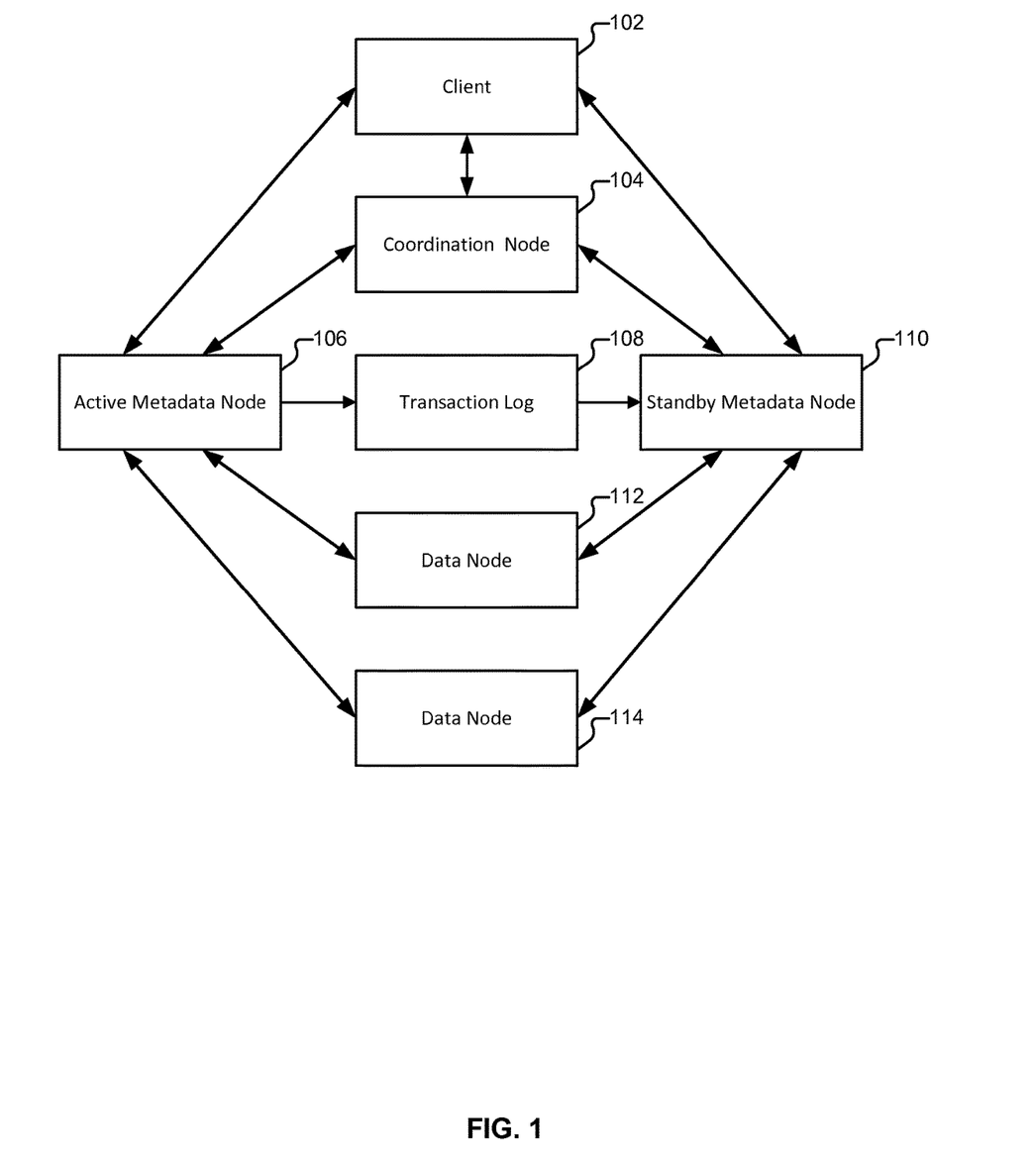
FIG. 1 is a block diagram illustrating an embodiment of an example distributed file system environment.

FIG. 1 is a block diagram illustrating an embodiment of an example distributed file system environment. Client 102 utilizes a distributed file system. For example, client 102 reads and writes files of the HDFS. The data of the distributed file system is stored/distributed across multiple data nodes such as data nodes 112 and 114.

Active metadata node 106 actively manages metadata of the distributed file system and functions as the active central node where clients and other components of the file system obtain and update metadata of the file system (e.g., information about data stored in the file system). For example, active metadata node 106 includes an HDFS NameNode that manages the file system namespace (e.g., directory structure and file name/path) and regulates access to data by clients. Data of the distributed file system is stored in a plurality of data nodes such as data nodes 112 and 114. For example, for each file of the distributed file system, the contents of the file is divided into one or more data blocks that are stored in one or more data nodes such as data nodes 112 and 114. A data block may be replicated for fault tolerance. Active metadata node 106 also manages file system namespace operations such as opening, closing, and renaming files and directories and mapping between a file of the file system and the exact data node(s) storing the data blocks of the file. Data nodes, such as data nodes 112 and 114, directly service read and write requests from file system clients, such as client 102. For example, client 102 obtains from active metadata node 106, the data node locations where data blocks of a file to be read are stored and directly accesses the data blocks from the identified data node locations. In some embodiments, data nodes may also perform data block creation, deletion, and replication upon instruction from a metadata node.

Standby metadata node 110 is ready to become an active metadata node if the current active metadata node 106 is unable to be the active metadata node. For example, if a failure or need for an update of active metadata node 106 is detected, standby metadata node 110 automatically becomes the new active metadata node and active metadata node 106 may become a standby metadata node (e.g., after repair or upgrade) that is ready to become the next active metadata node when the need arises. In order to reduce the amount of time required for standby metadata node 110 to become the active metadata node, standby metadata node 110 tracks metadata of the distributed file system modified by active metadata node 106.

The distributed file system includes metadata (e.g., file system namespace, file names, directory names, directory structure, locations of data blocks comprising a file, etc.) associated with data stored in the distributed file system. In addition to maintaining a current in-memory representation of the metadata that can be used to efficiently access latest versions of the metadata, active metadata node 106 records changes to the metadata and/or operations of the file system to transaction log 108. For example, a creation or deletion of a file is recorded to transaction log 108. In addition to recording changes to transaction log 108, a backup image of the metadata is captured at a determined point in time. The latest complete version of the metadata can be obtained using the backup image and applying changes recorded in the transaction log after the capture time of the backup image. For example, when an active metadata node is started, the backup image is read and entries of the transaction log recorded after the backup image was captured are applied to create an in-memory representation of the metadata. In some embodiments, this in-memory representation is saved as a new version of the backup image. In some embodiments, the backup image and transaction log does not include complete information that can be used to identify the location of data blocks stored in data nodes and identification of data blocks stored in a data node is received by the metadata node directly from the data node as needed. In some embodiments, multiple copies of the backup images and multiple transaction logs are maintained to provide fault tolerance. The multiple backup images and transaction logs may be updated synchronously.

Because active metadata node 106 maintains and provides metadata information of the distributed file system, it can be the single point of failure for the file system. Although the backup image, transaction log, and reports from data nodes can be used to recreate the metadata information in case of a failure, this process can be time consuming and may cause the file system to be unavailable for a prolonged period of time. To address this issue, standby metadata node 110 also maintains the metadata of the file system along with active metadata node 106. This allows standby metadata node 110 to become the active metadata node in a reduced amount of time. Changes to the file system that are received by active metadata node 106 from client 102 are recorded in transaction log 108. Standby metadata node can become aware of these changes to the file system without directly receiving the changes by reading the entries recorded in transaction log 108. Standby metadata node 110 reads entries in transaction log 108 and updates its in-memory representation of the file system metadata. Standby metadata may be associated with its own backup image or the same backup image as active metadata node 106.

Transaction log 108 only allows one metadata node to possess the ability to write its log at one time. This prevents the situation where two metadata nodes are simultaneously acting as the active metadata node and simultaneously writing changes to the transaction log. When standby metadata node 110 is in the process of becoming the active metadata node, transaction log 108 prevents active metadata node 106 from writing to transaction log 108 and allows standby metadata node 110 to become the only metadata writer of the log. For example, a metadata node cannot confirm file system changes without successfully writing the change to a transaction log. If metadata node 106 is no longer the active metadata node but tries to process a file system operation received from client 102 who incorrectly identified metadata node 106 as a fully functional active metadata node, metadata node 106 will return an error message to client 102 because it was unable to write to the transaction log 108 when trying to process the file system operation. Once standby metadata node 110 becomes the active metadata node, it performs all the functions previously performed by the previous active metadata node 106.

Data nodes 112 and 114 store data blocks of the file system in their local file system. In some embodiments, each data block is stored as a separate file in the local file system of the data node. When a data node is started or a metadata node is started, appropriate data node(s) each generate a report of all data blocks stored in the data node and sends the report to both the active metadata node and standby metadata node to allow both data nodes to maintain a current in-memory representation of the locations of the file system's data blocks. Once the report is sent, any subsequent changes to the data blocks stored by the data node can be sent to both metadata nodes as an update message. For example, data node 112 initially sends a report of data blocks stored by data node 112 to active metadata node 106 and standby metadata node 110 and subsequently sends update messages to both of the metadata nodes when a data block is deleted, moved or added. In this example, a data block may be moved or replicated from data node 112 to data node 114 (e.g., moved to free space on data node 112 or copied because of a high demand for the data block) and corresponding changes to the location of the data block are updated to active metadata node 106 and standby metadata node 110 that both use the update to update its in-memory metadata representation. Because standby metadata node 110 discovers changes to the file system metadata in a delayed manner by reading transaction log 108, in some cases, standby metadata node may receive updates to block locations from data nodes 112 or 114 that correspond to a metadata change that has not yet been read and processed from the transaction log. In this case, standby metadata node 110 rejects the update message from the data node and the data node sends the message again at a subsequent predetermined or dynamically determined time.

In some embodiments, data nodes 112 and 114 are aware which metadata node is the current active metadata node. This determination may be determined by inquiring the status of metadata nodes 106 and 110 and/or inquiring coordination node 104 for an identifier of the current active metadata node. For example, data node 112 sends a request for a status update to active metadata node 106 and standby metadata node 110 at periodic intervals to determine which node is the current active metadata node and detects errors (e.g., both or neither metadata node is the active metadata node). By being aware of which metadata node is the current active metadata node, the data node may ignore commands from a standby metadata node that should be only issued by an active metadata node (e.g., add, delete, move data block).

In some embodiments, data nodes 112 and 114 send status messages to metadata nodes 106 and/or 110 periodically. If an expected status message is not received from a data node, a metadata node may identify the data node as not available and correspondingly update its metadata to not reference the data node as storing one or more data blocks. The unavailability of the data node may cause a replication factor of a data block to fall below a specified value and cause the data block to be replicated in another data node.

Coordination node 104 manages the configuration/status of the components of the distributed file system. Coordination node 104 may determine whether a component of the file system has failed or needs to be upgraded. For example, coordination node 104 inquires and/or analyzes active metadata node 106 and standby metadata node 110 to determine whether to switch the roles of these nodes. Coordination node 104 may also manage which metadata node is the current active metadata node. For example, client 102 may inquire coordination node 104 for an identifier of the current active metadata node. This identifier may be cached by client 102 for future use until it is determined that the identifier is no longer valid. Using the identifier, client 102 contacts the current active metadata node to process a desired file system operation. For example, a request to create a new file is indicated to the active metadata node. The metadata node creates the new file in the directory structure of the file system and returns identifier(s) of data node(s) and data block(s) where the new file can be directly written.

In some embodiments, client 102 caches data (e.g., file) to be stored in the file system into a temporary local file. Writes to the data are transparently redirected to this temporary local file. When the local file reaches a predetermined size, a predetermined amount of time passes, or the data (e.g., file) is closed, the client contacts active metadata node 106 and metadata node 106 inserts the file name into the file system directory hierarchy and returns an identifier of the data node and the destination data block. Then the client flushes data of the local temporary file to the destination data block in the specified data node.

In some embodiments, in the example shown in FIG. 1, one or more of the components at least in part implements HDFS. For example in the context of HDFS, client 102 includes an HDFS client, coordination node 104 includes Zookeeper of the Apache Software Foundation, active metadata node 106 includes NameNode, transaction log 108 includes EditLog, standby metadata node 110 includes NameNode, data node 112 includes DataNode, and/or data node 114 includes DataNode. In some embodiments, one or more of the components shown in FIG. 1 include a wrapper component that extends an underlying HDFS component. For example, client 102 includes a wrapper component that extends an underlying HDFS client component. This wrapper component intercepts desired operations to the file system and provides a file system interface, and operations to the file system are processed, translated and/or passed to an underlying HDFS client component that communicates with other distributed file system components to complete the desired operations. In another example, active metadata node 106 and standby metadata node 110 include wrapper components that extend the underlying NameNode component to enable processing required to maintain a standby NameNode and to automatically handle the switch between becoming an active or standby NameNode. Data nodes 112 and 114 may also each include a wrapper component that extends the underlying DataNode component to handle the existence of a standby NameNode.

In some embodiments, the components shown in FIG. 1 may exist in various combinations of hardware machines. For example, client 102 may exist as a software component of a user machine. Coordination node 104 may be included in a cluster of servers (e.g., cluster of ZooKeeper servers) that allow coordination node 104 to be highly available. Transaction log 108 may be included in a machine built using commodity components that are of relatively lower cost than specialized transaction log hardware. In some embodiments, active metadata node 106 and standby metadata node 110 are included in different servers. One or more of the components shown in FIG. 1 may be included in the same machine. For example, active metadata node 106 and data node 112 may be included in the same server machine. In some embodiments, a single physical machine may only include a single data node. For example, data node 112 and data node 114 are included in different server machines.

In the example shown in FIG. 1, portions of the communication path between the components are shown. Other communication paths may exist and the example of FIG. 1 has been simplified to illustrate the example clearly. The components of FIG. 1 may communicate with another component via a network. Examples of the network include one or more of the following: a direct or indirect physical communication connection, mobile communication network, Internet, intranet, Local Area Network, Wide Area Network, Storage Area Network, and any other form of connecting two or more systems, components, or storage devices together. Although a single client, two metadata nodes, and two data nodes have been shown to simplify the diagram, additional clients, metadata nodes, data nodes, and other components shown in FIG. 1 may exist. Components not shown in FIG. 1 may also exist.

Figure 2:
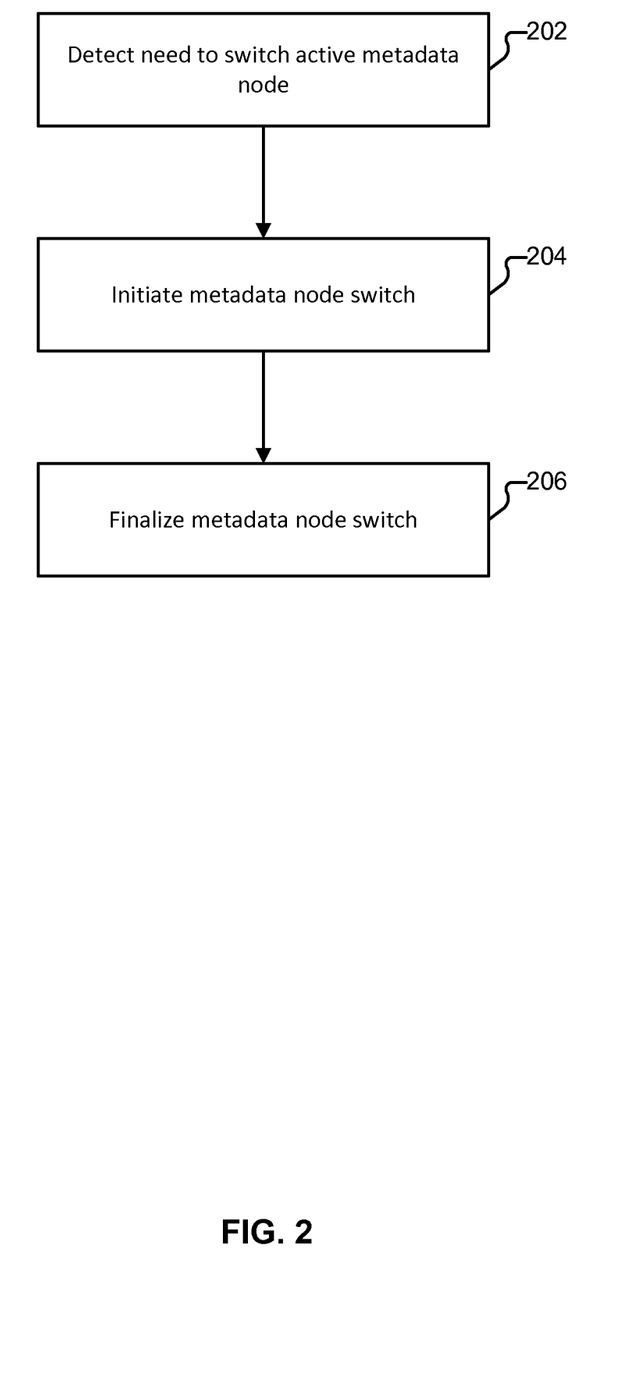
FIG. 2 is a flow chart illustrating an embodiment of a process for switching an active metadata node of a distributed file system.

FIG. 2 is a flow chart illustrating an embodiment of a process for switching an active metadata node of a distributed file system. This process may be at least in part implemented on a coordination node (e.g., coordination node 104 of FIG. 1) and/or a data node (e.g., data node 112 or data node 114 of FIG. 1). At 202, a need or desire to switch an active metadata node is detected. In some embodiments, detecting the need/desire includes detecting that a standby metadata node of a distributed file system should replace an active metadata node of the distributed file system as a new active metadata node. For example, it is detected that an active metadata node is not functioning properly, has failed, needs to be upgraded, and/or needs to be repaired. The detection in 202 may be determined at least in part by receiving an indication from the active metadata node, analyzing the metadata node, and/or querying the active data node.

At 204, the metadata node switch is initiated. In some embodiments, initiating the switch includes contacting a standby metadata node (e.g., node 110 of FIG. 1), a log (e.g., log 108 of FIG. 1), and/or an active metadata node (e.g., node 106 of FIG. 1) to initiate the replacement of a current active metadata node with a standby metadata node. For example, standby metadata node 110 of FIG. 1 is contacted by coordination node 104 to initiate the process of replacing metadata node 106 as the new active metadata node. When contacted to become the active metadata node, the standby metadata node may at least in part coordinate the automated process of placing the current active metadata node in a non-active state and obtaining the ability to write to a transaction log as the new active metadata node.

At 206, the metadata node switch is finalized. In some embodiments, the finalizing of the metadata node switch includes receiving a confirmation that one or more components of the distributed file system have been configured to allow the standby metadata node to become the new active metadata node and updating a record (e.g., record of coordination node 104) to reflect the new active metadata node. For example, when one or more components, such as clients and/or data nodes of a distributed file, do not know which node is the current active metadata node, the record is used to send to the component an identifier of the current active metadata node.

Figure 3:
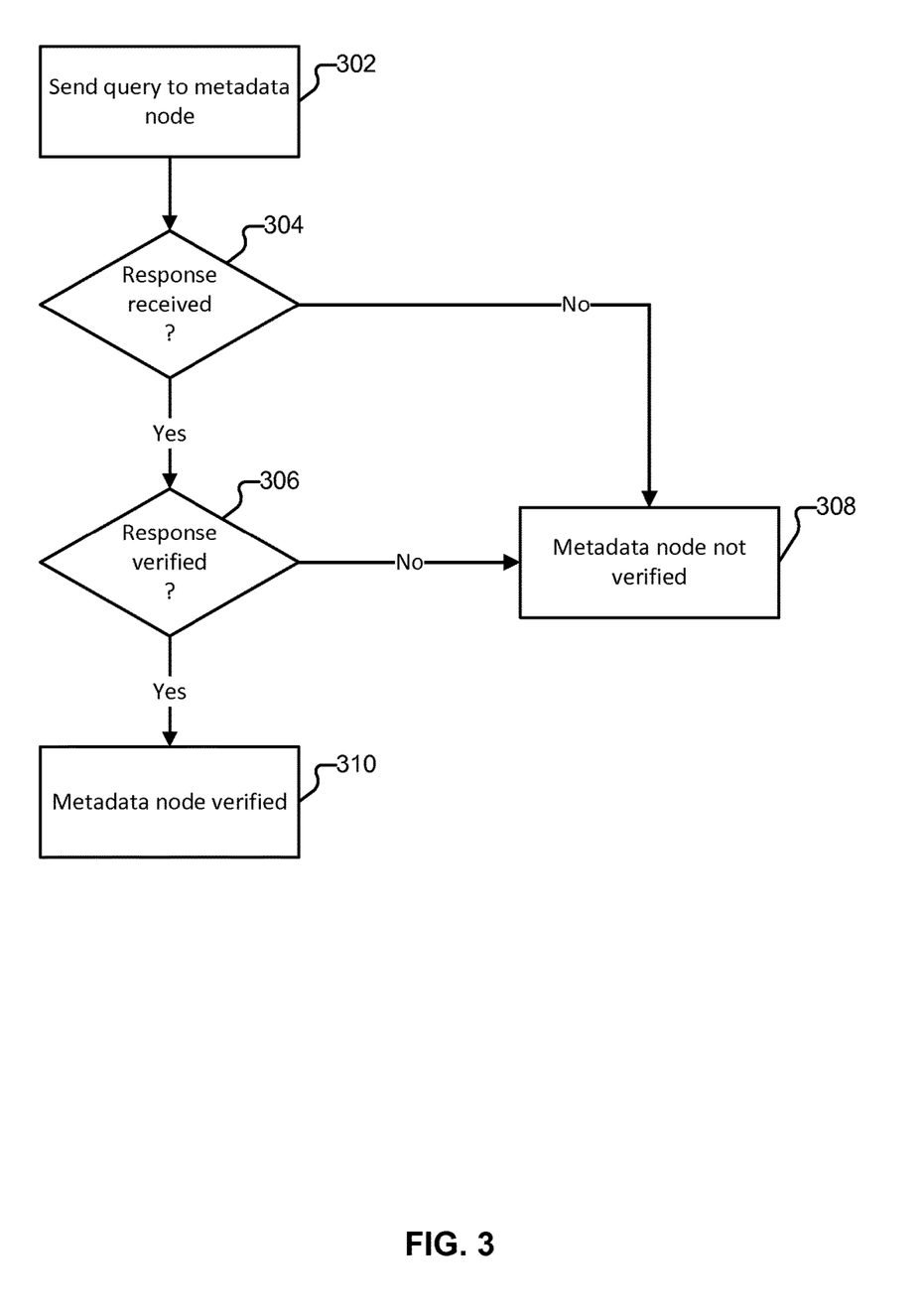
FIG. 3 is a flow chart illustrating an embodiment of a process for detecting a need to switch an active metadata node of a distributed file system.

FIG. 3 is a flow chart illustrating an embodiment of a process for detecting a need to switch an active metadata node of a distributed file system. In some embodiments, the process of FIG. 3 is included in 202 of FIG. 2. The process of FIG. 3 may be at least in part implemented in coordination node 104, standby metadata node 110, data node 112 and/or data node 114 of FIG. 1. At 302, a query is sent to a metadata node. An example of the metadata node includes active metadata node 106 of FIG. 1. In some embodiments, the query includes a request for a response associated with a status of the current active metadata node. The response may include a response acknowledging the receipt of the request and also may include additional information such as a status of a component of the node, profile information of the node, and/or information managed or stored by the node. The query may be sent periodically and/or dynamically. In some embodiments, the query is sent by a data node (e.g., data node 112 or data node 114 of FIG. 1) of a distributed file system as a "Heartbeat message" of an HDFS and/or as a request for identification of whether the metadata node is the current active metadata node. In some embodiments, the query is sent by a coordination node (e.g., coordination node 104) to assess the status of the current active metadata node.

If a response to the query is not received at 304, it is concluded at 308 that the metadata node is not verified. For example, if the current active metadata node does not respond to the query within a determined amount time, a determined number of queries, and/or before another determined response is received, it is assumed that the current active metadata node is not functioning properly and needs to be replaced. In some embodiments, if the metadata node is not verified, a need to switch the current active metadata node is indicated. For example, a metadata node switch in 204 of FIG. 2 is initiated.

If a response is received at 304, the response is analyzed at 306 to verify the status of the current active metadata node. If at 306 the response indicates that the current metadata node needs to be replaced (e.g., message indicates failure, need for upgrade, over utilization, etc.), the process proceeds to 308 where it is concluded that the metadata node is not verified. If at 306 the response is verified as indicating proper functioning of the current active metadata node, the process proceeds to 310 where the current active metadata node is verified as not needing to be replaced. In some embodiments, if the current active metadata node is verified, the current active metadata node remains the current active metadata node and the process of FIG. 3 is repeated at a later time to determine the status of the current active metadata node at the later time. In some embodiments, rather than using the process of FIG. 3 to verify the status of the current active metadata node, the process of FIG. 3 is used to assess the status of a standby metadata node (e.g., standby metadata node 110 of FIG. 1). In this case, if the status of the standby metadata node is not verified at 308, an indication may be sent that the standby metadata node needs to be repaired/replaced and/or the standby metadata may be automatically repaired/replaced.

Figure 4:
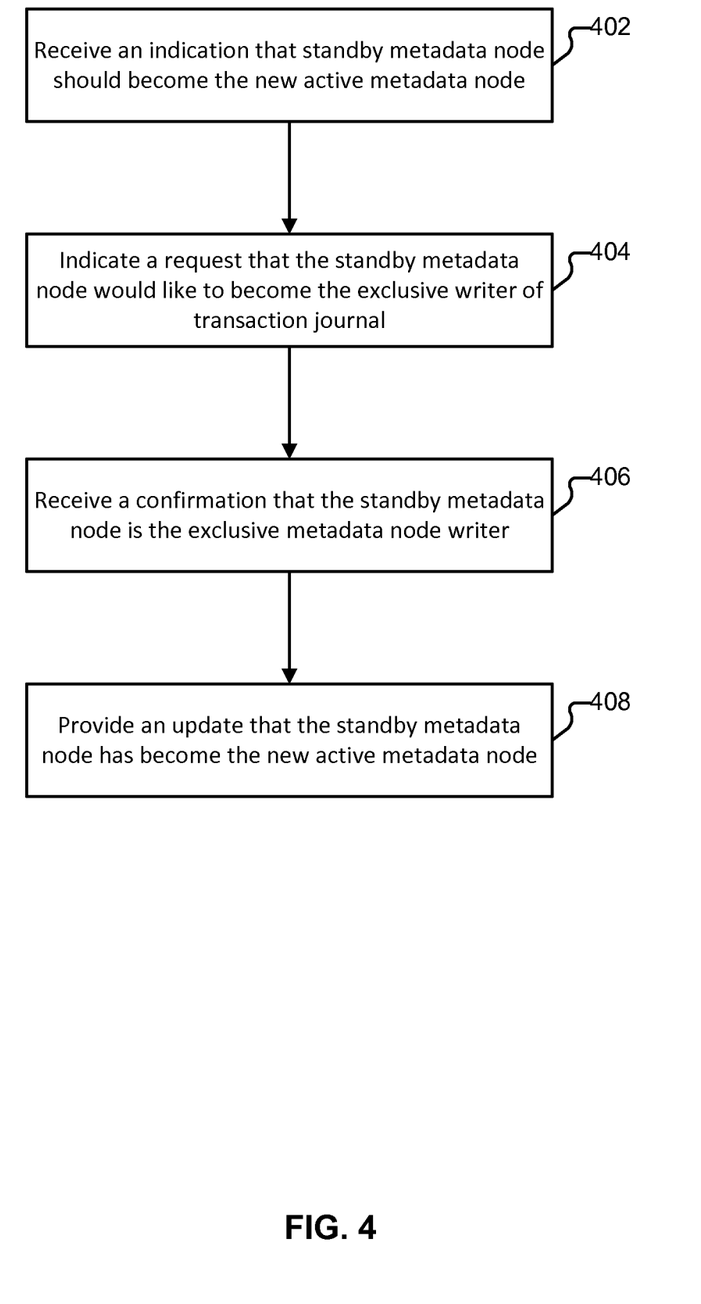
FIG. 4 is a flow chart illustrating an embodiment of a process for automatically transitioning a standby metadata node as the new active metadata node in a distributed file system.

FIG. 4 is a flow chart illustrating an embodiment of a process for automatically transitioning a standby metadata node as the new active metadata node in a distributed file system. In some embodiments, the process of FIG. 4 is included in 204 of FIG. 2. The process of FIG. 4 may be implemented in a standby metadata node such as standby metadata node 110 of FIG. 1. The process of FIG. 4 may be completed automatically without human intervention. At 402, an indication that a standby metadata node should become the new primary metadata node is received. In some embodiments, the indication is received from a node that has determined that the current active metadata node should be replaced. For example, the indication is received from a coordination node, an active metadata node, and/or a data node. In some embodiments, the indication initiates a coordination process to transition a standby metadata node to become an active metadata node. For example, a standby metadata node and a current active metadata node both utilize the same underlying software and both nodes have the ability to switch between becoming an active metadata node and a standby metadata node. In some embodiments, only one metadata node in a distributed file should be the active metadata node and the indication of 402 initiates the transition of a standby metadata node to become an active metadata node and the current active metadata node to become a standby metadata node. In some embodiments, a plurality of standby metadata nodes exist and the standby metadata node to become the new active metadata node is determined from the group randomly, dynamically, and/or sequentially.

At 404, a request that indicates that the standby metadata node would like to become an exclusive writer of a transaction journal is indicated. In some embodiments, this request is sent to a transaction log such as transaction log 108 of FIG. 1. For example, the transaction log only allows one metadata node to be configured as the writer of the transaction log at one time and the indication of 404 is used to update the identifier that identifies the current metadata node that is able to write to a transaction log. In some embodiments, all changes/operations to the distributed file system of the metadata node must be first written to a transaction log before the change can be committed. Any changes by the metadata node that are unable to be written to the transaction log may fail. This effectively allows only a single metadata node to be able to function as the active metadata node that is able to make changes to a distributed file system. In some embodiments, the request of 404 needs to be verified before the standby metadata node can become the exclusive writer. For example, the transaction log verifies with a coordination node or another appropriate node that the standby metadata node should be allowed to become the exclusive writer of the transaction log (e.g., as the new active metadata node). In some embodiments, the request of 404 causes a notification to be sent to the current active metadata node that it is no longer the active metadata node and/or that it is no longer able to write to the transaction journal. The current active metadata node may become a standby metadata node after receiving this notification.

At 406, a confirmation is received that the standby metadata node is the exclusive metadata node writer of the transaction log. The confirmation may be sent by the transaction log. In some embodiments, the confirmation ensures that no other metadata node is able to commit changes to the distributed file system. For example, once the confirmation is received, the previous metadata node that was able to write to the transaction journal is no longer able to fully function as an active metadata node. In some embodiments, the confirmation includes a key or other information that can be used to authenticate/verify the authority to write to the transaction log. In some embodiments, once the confirmation is received, the standby metadata node is further configured as the new active metadata node. For example, processing associated with being an active metadata node is performed.

At 408, an update that the standby metadata node has become the new active metadata node is provided. This update may be provided after the confirmation is received at 406. In some embodiments, the update is provided to a coordination node such as coordination node 104 of FIG. 1. For example, the metadata node that is to become the new active metadata node sends an update to the coordination node that it is ready to be identified as the active metadata node. The coordination node updates its records using the update to reflect the new active metadata node. Subsequently when an identifier of the current active metadata node is requested (e.g., by a client, a transaction log, a data node, and/or another metadata node, etc.), an identifier of the new active metadata node is provided. In some embodiments, the update of 408 is provided to a data node of the distributed file system. For example, a data node requests a status update from the new active metadata node and the active metadata node provides a status update that identifies the metadata node as the active metadata node. In some embodiments, the data node determines/verifies the identity of the new active metadata node from a coordination node such as coordination node 104 of FIG. 1.

Figure 5:
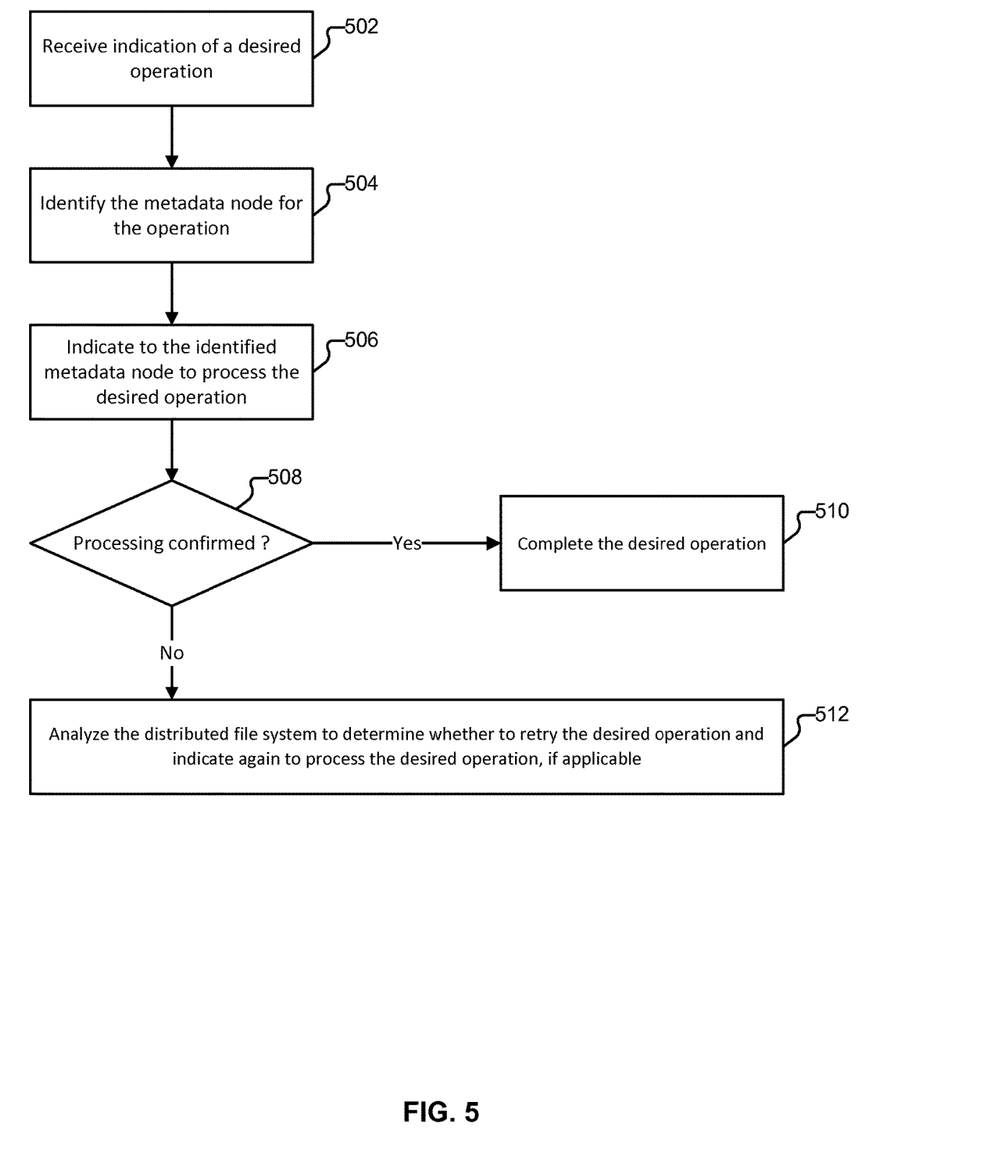
FIG. 5 is a flow chart illustrating an embodiment of a process for processing a desired operation of a distributed file system.

FIG. 5 is a flow chart illustrating an embodiment of a process for processing a desired operation of a distributed file system. The process of FIG. 5 may be implemented on a client of the distributed file system such as client 102 of FIG. 1. At 502, an indication of a desired operation is received. Examples of the operation include reading, obtaining, copying, writing, creating, deleting, renaming and moving data/file stored in the distributed file system or a namespace of the distributed file system. For example, a user of a client desires to read a file of the distributed file system and an indication of a desire to read the file is received. The indication may be received from a user, a program and/or a process of a client of the distributed file system. In some embodiments, in order to process the desired operation, an active metadata node such as active metadata node 106 of FIG. 1 is contacted to obtain an identifier of a data node that holds the data of interest and/or to obtain metadata (e.g., directory path) associated with the desired operation.

At 504, the metadata node for the operation is identified. In some embodiments, the metadata node desired in 504 is an active metadata node. An identifier of the metadata node may be cached by a client and/or obtained (e.g., from a coordination node such as coordination node 104 of FIG. 1). In some embodiments, identifying the metadata node includes determining whether the operation could be serviced by a standby metadata node instead of an active metadata node. For example, for certain operations that do not modify the distributed file system and do not rely on the most current metadata state of the distributed file system, a standby metadata node is able to process the operation in order to reduce the workload of the active metadata node. Even though the standby metadata node may not possess the most current metadata of the distributed file system (e.g., due to the delay caused by standby node 110 having to read the transaction log 108 to obtain the latest changes by the active metadata node 106 of FIG. 1), the standby metadata node is able to process operations such as a read operation that does not rely on the most current metadata state (e.g., for the purpose of ongoing maintenance scans).

At 506, an indication is sent to the identified metadata node to process the desired operation. In some embodiments, sending the indication includes attempting to contact the identified metadata node to verify that the contacted node is a desired type of metadata node (e.g., an active metadata node). In some embodiments, the indication of 506 includes an identifier of the desired operation.

At 508, it is determined whether the processing by the identified metadata node is confirmed. In some embodiments, processing the desired operation includes modifying or obtaining metadata to at least in part process the desired operation. In some embodiments, determining whether the processing is confirmed includes receiving a response from the contacted metadata node. The response may indicate whether the processing is confirmed. For example, the response includes a confirmation notification and/or information such as an identifier of a data node where at least a portion of the desired data may be accessed. In some embodiments, the processing is not confirmed because the contacted node is unable to process the desired operation. For example the contacted node may be unable to process the operation because the contacted node is unavailable, no longer fully functional, has encountered an error (e.g., unable to write to a transaction log), and/or is no longer an active metadata node.

If at 508, the processing by the identified metadata node is confirmed, at 510, the desired operation is completed. In some embodiments, completing the desired operation includes identifying that the desired operation has been completed. For example, an internal record of the client is updated to reflect that the desired operation has been completed. In some embodiments, completing the desired operation includes performing additional processing using information provided by the identified metadata node. For example, an identifier of a data node obtained from the identified metadata node is used to contact the data node to obtain/update desired data of the desired operation.

If at 508, the processing by the identified metadata node is not confirmed, at 512, the distributed file system is analyzed to determine whether to retry the desired operation and, if applicable, it is indicated again to process the desired operation. In some embodiments, the processing is not confirmed in 508 because the identified metadata node encountered difficulty (e.g., failure) during processing of the operation before a confirmation of processing success was able to be indicated. If the metadata node completed a portion of the processing and the completed portion has changed the distributed file system, the entire processing required for the desired operation cannot be retried in its entirety (e.g., retried when a standby metadata node become the new active metadata node) because duplicating changes to the file system may cause errors. In some embodiments, determining whether to retry the desired operation includes determining whether processing the desired operation requires a modification to the distributed file system. For example, a desired operation such as a read request is retried in its entirety because a failed read request does not modify the distributed file system. However, a file move request may not be retried because it modifies the file system. In some embodiments, analyzing the distributed file system includes determining which portion of the processing by the identified metadata node has been completed. For example, only the uncompleted portion of the processing is indicated to be performed in a subsequent indication. In some embodiments, indicating again to process the desired operation includes identifying a new metadata node (e.g., a standby metadata node that has become the new active metadata node) and indicating at least a portion of the desired operation to the newly identified metadata node.

For example, a failure in the current active metadata node may occur and the active metadata node may have to be replaced by a standby metadata node. If processing by the identified metadata node is not confirmed, it is unknown at which stage the metadata node became not fully functional. If the desired operation will not change the file system (e.g., a read operation), the desired operation may be retried because the retry will not change the file system. However, if the desired operation will change the file system, it is desirable to determine what changes to the file system have been already completed by the metadata node before the node becomes not fully functional in order to not duplicate changes that have been already completed as a part of the processing by the metadata node. Based on this analysis, none, a portion, or the entire processing required to process the desired operation may be indicated again.

Figure 6:
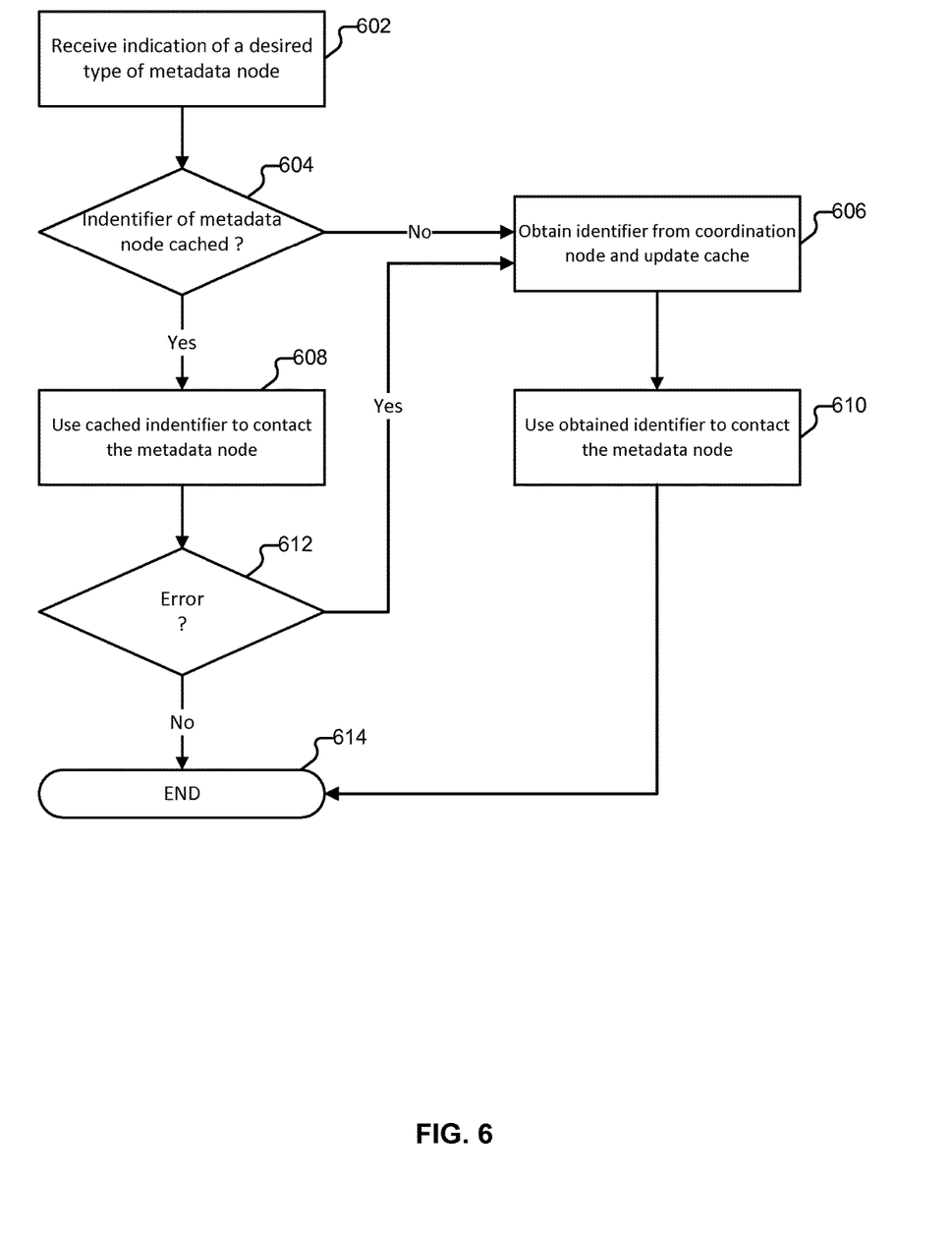
FIG. 6 is a flow chart illustrating an embodiment of a process for obtaining an identifier of a metadata node of a distributed file system.

FIG. 6 is a flow chart illustrating an embodiment of a process for obtaining an identifier of a metadata node of a distributed file system. In some embodiments, the process of FIG. 6 is at least in part included in 504 and 506 of FIG. 5. The process of FIG. 6 may be implemented in a client such as client 102 of FIG. 1. At 602, an indication of a desired type of metadata node to process a desired operation is received. In some embodiments, determining the metadata node includes determining whether the operation could be serviced by a standby metadata node instead of an active metadata node. For example, for certain operations that do not modify the distributed file system and do not rely on the most current metadata state of the distributed file system, a standby metadata node is able to process the operation in order to reduce the workload of the active metadata node. In some embodiments, if the desired type of metadata node is a standby metadata node and a plurality of standby metadata nodes exist, a specific standby metadata node may be selected randomly, sequentially, and/or dynamically (e.g., based on a utilization metric). Step 602 may be optional. For example, all desired operation is processed by an active metadata node.

At 604, it is determined whether an identifier of the metadata node has been cached. For example, a client caches an identifier of the previously accessed metadata node. The cached identifier may be specific to a certain operation and a cached identifier may be selected amongst a plurality of cached identifiers using an operation type, a data type, or data location associated with the desired operation. For example, even though an identifier has been cached for one type of operation, it is determined that an identifier has not been cached for the desired operation because the desired operation is another type of operation. In some embodiments, the identifier of the metadata node has been cached when a previous operation was processed. For example, the identifier was obtained and cached from a coordination node such as coordination node 104 of FIG. 1 when processing the previous operation. The cached identifier may be removed or no longer used after a predetermined amount of time from when the identifier was cached and/or when it was determined (e.g., due to a received a message) that the cached identifier was no longer valid. In some embodiments, the cached identifier of the metadata node is periodically updated.

If at 604 it is determined that the identifier of the metadata node for the desired operation is cached, at 608 the cached identifier is used to contact the metadata node. For example, the metadata node is contacted using the identifier to indicate to the metadata node to process the desired operation. Step 608 may be included in step 508 of FIG. 5. If at 612 the metadata node has been successfully contacted, the process ends at 614. However, the metadata node may not be successfully contacted using the cached identifier. For example, the cached identifier is no longer valid because the metadata node is no longer a desired type (e.g., active) of metadata node and/or no longer available (e.g., due to failure or an update process).

If at 612 the metadata node has not been successfully contacted using the cached identifier or at 604 it is determined that the identifier is not cached, at 606, the identifier of the metadata node is obtained from a coordination node of the distributed file system. An example of the coordination node includes coordination node 104 of FIG. 1. In some embodiments, a desired type of metadata node (e.g., active or standby) is indicated to the coordination node and the coordination node responds with an identifier of the desired metadata node. In other embodiments the coordination node only provides an identifier of the current active metadata node. The obtained identifier may be cached for potential future use. At 610, the obtained identifier is used to contact the metadata node. For example, the metadata node is contacted using the identifier to indicate to the metadata node to process the desired operation. Step 610 may be included in step 506 of FIG. 5. The process of FIG. 6 ends at 614.

Figure 7:
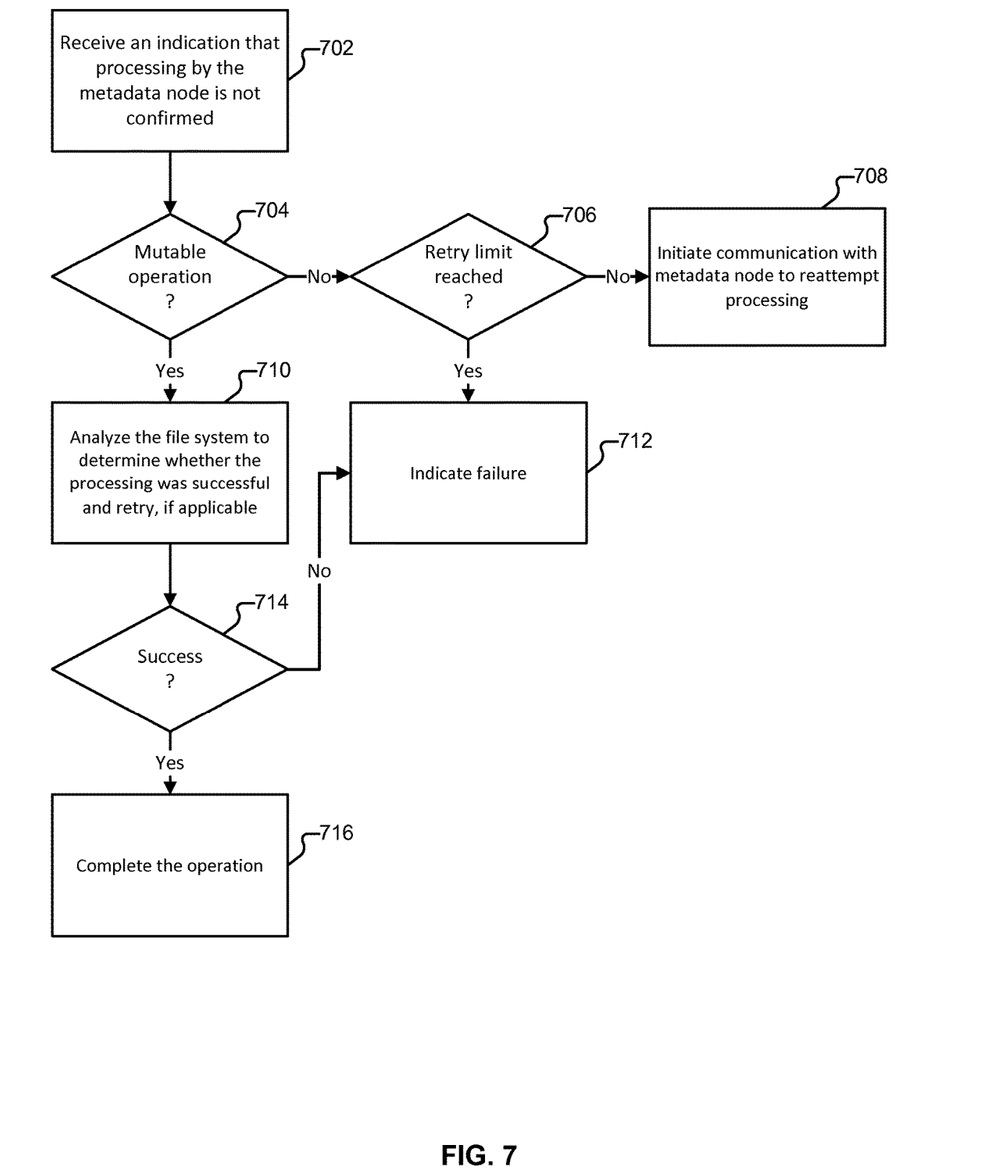
FIG. 7 is a flow chart illustrating an embodiment of a process for determining whether to retry a desired operation of a distributed file system.

FIG. 7 is a flow chart illustrating an embodiment of a process for determining whether to retry a desired operation of a distributed file system. In some embodiments, the process of FIG. 7 is included in 512 of FIG. 5. The process of FIG. 7 may be implemented on client 102 of FIG. 1. At 702, an indication is received that processing by a metadata node is not confirmed. In some embodiments, the process is associated with an operation desired by a client of the distributed file system. For example, the indication is received in response to a request sent to the metadata node to process a desired operation of the client in 506 of FIG. 5. In some embodiments, the indication may be received from the metadata node and/or another component of the distributed file system. In some embodiments, the indication is determined. For example, if a response to a request is not received after a predetermined amount of time, an indication is indicated that the processing is not confirmed. In some embodiments, the processing is not confirmed because the metadata node encountered difficulty (e.g., failure) during processing of the operation before a confirmation of processing success was able to be indicated. If the metadata node completed a portion of the processing and the completed portion has changed the distributed file system, the entire processing required for the desired operation cannot be retried in its entirety again because duplicating changes required to process the operation may cause errors.

At 704, it is determined whether a desired operation associated with the processing in 702 is a mutable operation. An operation is a mutable operation if processing the operation will require a change in the file system. For example, operations that delete, create, move or otherwise modify a file, directory name and/or directory structure are mutable operations. An operation is an immutable operation if processing the operation will not require a change in the file system. For example, operations that read a file, directory name and/or directory structure are immutable operations. If at 704 it is determined that the operation is an immutable operation, it is determined at 706 whether a retry limit has been reached. For example, because an immutable operation that has not been successfully completed may be retried without affecting the file system because a partially processed immutable operation does not modify the file system, an immutable operation may be processed again in its entirety. However, it may be desired to limit the number of times an immutable operation is retried.

If at 706 the retry limit has not been reached, at 708 communication with a metadata node is initiated to reattempt to process a desired immutable operation. In some embodiments, the metadata node of the reattempt is a different metadata node than the metadata node in 702. For example, in 702 the processing of a desired immutable operation was not confirmed by the metadata node because the metadata node, which is an active metadata node, has encountered an error and is being switched with a standby metadata node that will become a new active metadata node. In this example, the processing is reattempted in 708 using the new active metadata node. In some embodiments, if the reattempt is not successful, the process returns to 702 and if the reattempt is successful, the process returns to 716. If at 706 the retry limit has been reached, at 712, a failure of the operation associated with the processing of 702 is indicated. In some embodiments, the failure is indicated to a system process and/or a user of a client of the distributed file system.

If at 704 it is determined that the operation is a mutable operation, at 710, the distributed file system is analyzed to determine whether the processing was at least in part successful and the processing is at least in part retried, if applicable. In some embodiments, analyzing the file system to determine whether the processing was at least in part successful includes determining the changes the processing of 702 has made to the distributed file system. In some embodiments, analyzing the file system includes requesting metadata information from a metadata node.

For example, the processing of 702 is associated with a desired file system operation (e.g., rename file) and the file system is analyzed to determine which steps in processing the desired operation have been completed by the metadata node that has been previously instructed to process the operation. In an example of a file or directory delete operation, analyzing the file system includes determining whether the file/directory to be deleted exists in the file system. In an example of a file or directory rename operation, analyzing the file system includes determining whether a file/directory with the old name exists and determining whether a file/directory with the new name exists in the file system. In an example of a file or directory move operation, analyzing the file system includes determining whether the file/directory exists at the old location and determining whether the file/directory exists at the new location. In an example of a file or directory create operation, analyzing the file system includes determining whether the file/directory has been created and whether the file/directory includes contents.

Based on the analysis, at least a portion of the processing is retried again, if applicable. In some cases, it is determined that no additional processing is necessary in 710 because the required processing has been already completed. In some embodiments, the retry in 710 is performed using a different metadata node than the metadata node in 702. For example, in 702, the processing of a desired mutable operation was not confirmed by the metadata node because the metadata node, which is an active metadata node, has encountered an error and is being switched with a standby metadata node that will become a new active metadata node. In this example, the processing is reattempted in 710 using the new active metadata node.

If at 714 it is determined that the retried processing performed in 710 was not successful, the process proceeds to 712 where a failure of the operation is indicated. In other embodiments, if the retried processing was not successful, step 710 is retried for a predetermined or dynamically determined number of times. If at 714 it is determined that the retried processing performed in 710 was successful, at 716, the file system operation associated with the processing in 710 is completed. In some embodiments, completing the operation includes identifying that the operation has been completed. For example, an internal record of the client is updated to reflect that the desired operation has been completed. In some embodiments, completing the operation includes performing additional processing using information provided by the metadata node that was used for processing in 710. For example, an identifier of a data node obtained from the identified metadata node is used to contact the data node to update data associated with the operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a file system operation, comprising:
    a processor configured to:
        receive an indication of a desired operation of a distributed file system, wherein the desired operation is to be performed on a target data indicated by the indication of the desired operation;
        identify a metadata node for the desired operation, wherein the metadata node includes a NameNode of a HADOOP file system that regulates access to data of the HADOOP file system;
        indicate to the identified metadata node an instruction to process the desired operation; and
        in the event it is determined that the identified metadata node cannot complete the instruction to process the desired operation, analyze the distributed file system including by determining whether to indicate the instruction again to process the desired operation, wherein determining whether to indicate the instruction again to process the desired operation includes determining whether the desired operation includes a mutable operation that modifies a content of the target data of the desired operation in a manner that prevents fully proceeding with the mutable operation again due to a risk of error to the HADOOP file system caused by retrying the mutable operation; and
        in the event it is determined that the desired operation includes the mutable operation, request metadata information from a second metadata node different than the identified metadata node and determine which processing stage of the desired operation has been already completed by the identified metadata node; and
    a memory coupled to the processor and configured to provide the processor with instructions.

2. The system of claim 1, wherein the system hosts a client of the distributed file system.

3. The system of claim 1, wherein the desired operation includes one or more of the following: a read operation to read data stored in the distributed file system, a copy operation to copy data stored in the distributed file system, a write operation to write data to the distributed file system, a create operation to create data in the distributed file system, a delete operation to delete data stored in the distributed file system, a move operation to move data stored in the distributed file system, and a namespace modification operation to modify namespace of the distributed file system.

4. The system of claim 1, wherein identifying the metadata node includes identifying a cached identifier of the metadata node, and the cached identifier has been cached by the system.

5. The system of claim 4, wherein identifying the cached identifier of the metadata node includes identifying the identifier from a plurality of cached identifiers based at least in part on the desired operation.

6. The system of claim 4, wherein in the event the cached identifier is an invalid identifier, a request is sent to another system for an updated identifier of the metadata node.

7. The system of claim 1, wherein identifying the metadata node includes sending a request to another system for an identifier of the metadata node.

8. The system of claim 1, wherein identifying the metadata node includes determining whether the desired operation can be processed by a standby metadata node of the distributed file system.

9. The system of claim 8, wherein the desired operation can be processed by the standby metadata node if the operation does not require a most current metadata state of the distributed file system.

10. The system of claim 1, wherein indicating the instruction to the identified metadata node to process the desired operation includes attempting to contact the identified metadata node to verify that the contacted node is a desired metadata node.

11. The system of claim 1, wherein in the event the instruction to process the desired operation by the identified metadata node is confirmed, the processor is further configured to complete the desired operation.

12. The system of claim 11, wherein completing the desired operation includes updating a record to reflect that the desired operation has been completed.

13. The system of claim 11, wherein completing the desired operation includes performing additional processing using information provided by the identified metadata node.

14. The system of claim 1, wherein analyzing the distributed file system to determine whether to indicate the instruction again to process the desired operation includes determining whether processing the desired operation for at least a second time again includes performing the modification to the target data of the desired operation to complete the desired operation.

15. The system of claim 1, wherein in the event it is determined that desired operation is the mutable operation that modifies the content of the target data, it is determined to not fully indicate the instruction again, and in the event it is determined that desired operation is not the mutable operation that modifies the content of the target data, it is determined to indicate the instruction again.

16. The system of claim 1, wherein in the event it is determined to not indicate the instruction again to process the desired operation in its entirety, it is determined which portion of the processing of the desired operation by the identified metadata node has been completed.

17. The system of claim 1, wherein based on the analysis of the distributed file system, a portion of the processing required to process the desired operation is indicated.

18. The system of claim 1, wherein in the event it is indicated again to process the desired operation, the indication is sent to a different metadata node than the metadata node of the identified metadata node of the previous indication.

19. A method for processing a file system operation, comprising:
   receiving an indication of a desired operation of a distributed file system, wherein the desired operation is to be performed on a target data indicated by the indication of the desired operation;
   identifying a metadata node for the desired operation, wherein the metadata node includes a NameNode of a HADOOP file system that regulates access to data of the HADOOP file system;
   indicating to the identified metadata node an instruction to process the desired operation; and
   in the event it is determined that the identified metadata node cannot complete the instruction to process the desired operation, using a processor to analyze the distributed file system including by determining whether to indicate the instruction again to process the desired operation, wherein determining whether to indicate the instruction again to process the desired operation includes determining whether the desired operation includes a mutable operation that modifies a content of the target data of the desired operation in a manner that prevents fully proceeding with the mutable operation again due to a risk of error to the HADOOP file system caused by retrying the mutable operation; and
   in the event it is determined that the desired operation includes the mutable operation, requesting metadata information from a second metadata node different than the identified metadata node and determining which processing stage of the desired operation has been already completed by the identified metadata node.

20. A computer program product for processing a file system operation, the computer program product being embodied in a non-transitory tangible computer readable storage medium and comprising computer instructions for:
   receiving an indication of a desired operation of a distributed file system, wherein the desired operation is to be performed on a target data indicated by the indication of the desired operation;
   identifying a metadata node for the desired operation, wherein the metadata node includes a NameNode of a HADOOP file system that regulates access to data of the HADOOP file system;
   indicating to the identified metadata node an instruction to process the desired operation; and
   in the event it is determined that the identified metadata node cannot complete the instruction to process the desired operation, analyzing the distributed file system including by determining whether to indicate the instruction again to process the desired operation, wherein determining whether to indicate the instruction again to process the desired operation includes determining whether the desired operation includes a mutable operation that modifies a content of the target data of the desired operation in a manner that prevents fully proceeding with the mutable operation again due to a risk of error to the HADOOP file system caused by retrying the mutable operation; and
   in the event it is determined that the desired operation includes the mutable operation, requesting metadata information from a second metadata node different than the identified metadata node and determining which processing stage of the desired operation has been already completed by the identified metadata node.

* * * * *